United States Patent [19]

Derleth et al.

[11] Patent Number: 5,736,118
[45] Date of Patent: Apr. 7, 1998

[54] METHOD OF PRODUCING SPHERICAL PARTICLES

[75] Inventors: Helmut Derleth; Karl-Heinz Bretz, both of Nienburg/Weser, Germany

[73] Assignee: Solvay Deutschland GmbH, Hanover, Germany

[21] Appl. No.: 513,885

[22] PCT Filed: Mar. 1, 1994

[86] PCT No.: PCT/EP94/00587

§ 371 Date: Sep. 5, 1995

§ 102(e) Date: Sep. 5, 1995

[87] PCT Pub. No.: WO94/20203

PCT Pub. Date: Sep. 15, 1994

[30] Foreign Application Priority Data

Mar. 5, 1993 [DE] Germany ............... 43 06 875.8
Feb. 18, 1994 [DE] Germany ............... 44 05 202.2

[51] Int. Cl.$^6$ ............................. B29B 9/00; B01J 35/08
[52] U.S. Cl. ............................. 423/659; 264/13; 264/659; 23/313 R
[58] Field of Search ............................. 23/313 R; 502/9; 264/13; 423/659

[56] References Cited

U.S. PATENT DOCUMENTS

| 2,467,470 | 4/1949 | Gerhold et al. ............... 502/9 |
| 2,652,371 | 9/1953 | Gring ............... 264/13 |
| 3,233,011 | 2/1966 | Kurz et al. ............... 264/13 |
| 3,558,508 | 1/1971 | Keith et al. ............... 502/8 |
| 3,579,721 | 5/1971 | Kaltenbach ............... 264/13 |
| 3,677,938 | 7/1972 | Le Page et al. ............... 210/656 |
| 3,840,348 | 10/1974 | Vessey ............... 23/313 R |
| 4,514,511 | 4/1985 | Jacques et al. ............... 502/8 |
| 4,990,266 | 2/1991 | Vorlop et al. ............... 210/748 |
| 4,994,422 | 2/1991 | Goldman ............... 502/9 |

FOREIGN PATENT DOCUMENTS

| 207393 | 7/1959 | Austria ............... 23/313 |
| 359074 | 3/1990 | European Pat. Off. . |
| 2397231 | 7/1978 | France . |
| 1667669 | 3/1978 | Germany . |
| 027228 | 8/1906 | Sweden ............... 23/313 R |
| 1584900 | 2/1981 | United Kingdom . |
| WO 92/07653 | 5/1992 | WIPO . |

*Primary Examiner*—Gary P. Straub
*Attorney, Agent, or Firm*—Evenson, McKeown, Edwards & Lenahan P.L.L.C.

[57] ABSTRACT

A method of producing spherical particles made from inorganic oxides by sol/gel conversion in which a sol is sprayed upwards from below into a reaction zone containing a reactant gas in such a way that the sol does not split up into individual droplets until immediately before or as it enters the reaction zone, and the resulting droplets fly through the reaction zone along a curved trajectory during which they are presolidified, the presolidified droplets being caught in a trap. Also described are spherical particles made from inorganic oxides with a narrow pore diameter distribution and a high resistance to wear which are suitable for use as catalysts, catalyst supports, adsorbents drying agents or ion exchange materials.

14 Claims, 8 Drawing Sheets

METHOD OF PRODUCING SPHERICAL PARTICLES

The present invention relates to a method of producing spherical particles made from inorganic oxides, to the particles obtained according to this method as well as to their use.

Spherical particles made from inorganic oxides, for example, from silicon dioxide, aluminum oxide, alumosilicate, magnesium oxide, titanium dioxide or zirconium dioxide, are used on a large scale as catalysts, catalyst supports, adsorbents, drying agents or ion exchange materials. For most of the indicated purposes, particles are required which have a uniform spherical shape and a narrow grain spectrum in order to therefore permit a packing which is as uniform as possible and a packing density which is as high as possible, for example, in the fixed-bed reactor. If the particles are used in the moving-bed reactor, an increased resistance to wear is also expected of the particles. If the particles are to be used in catalysts or catalyst supports, they must, in addition to a narrow grain spectrum, also have a defined specific surface and a specific pore volume.

Normally, spherical particles are obtained from inorganic oxides, for example, from silicon dioxide, aluminum oxide, alumosilicates and/or other oxides according to the generally known sol/gel process. According to this process, as described, for example, in German Patent Document DE-AS 1 667 669, the production of spherical silicon dioxide particles takes place in that an aqueous solution of an alkali metal silicate is mixed with an aqueous solution of an acid. A sol is obtained in this manner which is converted into drop-shaped particles when are then caused to gel in a so-called forming oil. The forming oil used in this case is usually a fluid which cannot be mixed with water, such as mineral oil, crude petroleum or kerosine. In a further process step, a so-called cation exchange is then carried out in which the alkali metal content of the obtained particles is reduced in an aqueous medium to less than 1% in weight, relative to the dry substance. The particles will then be washed, dried and calcined. According to this process, the shaping of the formed particles depends on the rate at which the sol drops fall through the forming oil, in which case the falling speed of the sol drops is a function of the specific weight and of the viscosity of the fluid used as the forming oil. According to another method, which is known per se, the shaping of the particles may also take place in that the sol drops obtained after the alkali metal silicate solution is added to the aqueous acid solution, is caused to fall through an air column under the force of gravity, in which case the drops will gel during the fall. According to this method, the gelling time and the falling height must be precisely coordinated with one another. If the drops are not sufficiently presolidified, there is the risk that they may be deformed when they impact on the reaction fluid.

According to International Patent Document WO 92/07653, a sol/gel process is known according to which spherical particles are produced from aluminum oxide. In this case, spherical drops made from an aluminum oxide hydrosol are produced by a nozzle plate which is caused to vibrate, are then presolidified by being exposed to a lateral blowing-on of ammonia gas and are then collected in an aqueous ammonia solution. When particles are produced which have a larger diameter, the particles must normally be caused to pass through a foam layer so that the impact of the particles on the ammonia solution is slowed down in order to this prevent a deformation or breaking-apart of the drops. According to this process, the used aluminum oxide sol or the aluminum oxide suspension should have a defined viscosity in the range of from 10 to 500 mPa at room temperature.

In U.S. Pat. No. 2,652,371, a method is described of producing and classifying the sizes of silicon dioxide particles, in which sodium silicate sol drops are sprayed at an oblique angle in which case, by means of a blowing-on of an inert gas, are wide ray of sol drops of different sizes is produced which permits a classification of the sizes on the basis of the different flight widths which depend on the mass of the respective drops ("cross-flow method"). In this case, only the drops of the desired size will gain access to the reaction fluid causing the gelling while the remaining sol drops are returned by way of a trap for generating drops. In order to avoid large amounts of waste, this requires that the gelling of the sol drops does not start before the arrival in the reaction fluid so that also in the case of this method, there is the risk of deformation during the impact of the not yet presolidified particles on the reaction fluid.

According U.S. Pat. No. 3,558,508, a method is known of producing aluminum oxide balls in the case of which an acid aluminum oxide hydrate is entered in drop form into a mixture of mineral oil and carbon tetrachloride saturated with gaseous ammonia. The particles obtained in this manner have a wide distribution of pore diameters with a large proportion of macropores above 200 Å.

There is therefore a continued demand for a method according to which spherical particles can be produced from inorganic oxides according to a sol/gel method of a spherical shape which are as optimal as possible, have a narrow grain spectrum as well as a narrow distribution of pore diameters.

It is therefore an object of the invention to provide a method for producing spherical particles from inorganic oxides which permits the shaping of particles which are as uniformly spherical as possible and have a narrow grain spectrum and a narrow pore diameter distribution.

A method was now found of producing spherical particles made from inorganic oxides by means of a sol/gel conversion, in the case of which a sol is sprayed in such a manner from below into a reaction zone containing a reactant gas that the sol does not split open into individual sol droplets until immediately before or as it enters the reaction zone and the formed sol droplets fly through the reaction zone on a curved trajectory while being solidified, and the presolidified sol particles are then caught in a trap. As a result of the method of operation according to the invention, the location and point in time of the sol droplet formation are advantageously coordinated with the start of the gelling (presolidification) of the sol droplets. The sol droplets, which at the point in time of their formation are still liquid sol drops of an almost ideal spherical shape and largely the same spherical diameter, when flying through the reaction zone, are fixed in their almost ideal uniformly spherical shape; that is, they are presolidified so that they are largely protected from deforming effects before, by means of additional measures of the sol/gel process which are known per se, the sol droplets which were presolidified in their spherical shape are finally solidified to be stable. For this purpose, the spraying device is arranged at a defined distance—which is easily determined by a person skilled in the art, as described below—below the inlet opening into the reaction zone, the distance corresponding approximately to that distance starting from the spraying device at which the sol splits open into sol droplets. In addition, the sol is injected from the spraying device from below, that is, against the force of gravity, at a certain angle α into the reaction zone, the angle α in this case being formed from a horizontal axis disposed perpendicularly to the force of gravity and of the tangent of the sprayed sol in the outlet point from the spraying system.

According to the method of the invention, a gelable sol is therefore sprayed from below into the reaction zone, particularly at an angel of $\alpha<90°$. In this case, depending on the particle size range, syringes may be used which have hollow needles of different diameters, or spraying nozzles, centrifugal disks, spray wheels, ultrasonic nozzles or bells, spray guns, turbobells, solenoids, mechanically driven nozzles or spraying systems which are known per se and which are used in electrostatic spraying or in jet printers (for example, piezoexcited nozzles). In this case, the particle size range is varied by means of the used spraying device. Therefore, when the desired particle size is in the range of from 0.01 mm to 0.3 mm, turbobells, micro-solenoids or spraying nozzles, for example, spiral nozzles which are known per se (such as spiral nozzles of the firm Spraybest) or preferably ultrasonic nozzles, are expediently used. When the desired particle size is in the range of from 0.3 mm to 5 mm, particularly from 0.3 mm to 3.5 mm, spraying wheels or preferably hollow needles of a corresponding diameter are expediently used. In the case of a very narrow distance of the spraying device from the inlet opening of the reaction zone containing the reactant gas, it may be expedient, for example, when spraying nozzles or hollow needles with a small diameter are used, to blow rinsing gas (such as compressed air or water vapor) at the spraying device in order to avoid a clogging of the spraying device by prematurely gelling sol.

The method according to the invention is generally suitable for producing particles which can be produced by the gelling of gelable solutions; that is, they can be produced in a sol/gel reaction. In this case, the sol may be present as an instable sol, which was obtained by combining two constituents, or as a metastable sol, which gels only when it comes in contact with the reactant gas. In particular, the method according to the invention is suitable for producing particles made from inorganic oxides by a sol/gel conversion. In this case, inorganic oxides are particularly the oxides from the magnesium oxide, aluminum oxide, silicon dioxide, aluminosilicate, zinc oxide, titanium dioxide, chromium oxide, copper oxide, manganese oxide, cerium oxide, tin oxide, iron oxide, nickel oxide, lead oxide, molybdenum oxide, vanadium oxide, thorium oxide, zirconium oxide and/or hafnium oxide group. Preferred oxides are alumosilicate, aluminum oxide and/or silicon dioxide. In this case, the term "inorganic oxide" comprises the mentioned metal oxides separately as well as mixed oxides, particularly binary and tertiary mixed oxides whose one constituent is silicon dioxide, aluminum oxide or alumosilicate. Inorganic oxides are also such oxides which, in addition to the gel-forming oxidic constituents, contain further additives which improve the application-related and/or catalytic features.

The method according to the invention can be used for the gelling of sols in the case of which, according to the sol/gel process, an instable sol is obtained, for example, by mixing an alkaline constituent with an acid constituent. Preferably, according to this approach, particles are made from silicon dioxide or alumosilicate. Thus, for example, a sol can be obtained which contains a silicon dioxide and which can be used in the method according to the invention in that, as the alkaline constituent, an aqueous solution of an alkali metal silicate, such as a sodium silicate solution, is mixed in a manner known per se with an aqueous solution of an inorganic acid, such as an aqueous sulfuric acid solution or hydrochloric acid solution, or an organic acid, such as an aqueous formic acid solution or acetic acid solution. Additional constituents, such as aluminum or magnesium compounds, may be added to the alkaline as well as to the acid constituent. In another variant, an instable sol may be obtained which contains a silicon dioxide in that silicic acid alkyl ester is reacted with an alkaline constituent, for example, with NaOH, $NH_3$, or an acid constituent, for example, with hydrochloric acid, or silicon tetrachloride is reacted with an acid constituent, for example, with aqueous formic acid. Another possibility for producing particles which contain silicon dioxide and which can be used in the method according to the invention consists of using a metastable siliceous sol (such as Bayer S200®).

According to the method of the invention, sols may also be used which contain further constituents in a homogeneous or heterogeneous form. As heterogeneous constituents, they may contain, for example, fine fractions of any type, quantity and particle size known per se. For improving the application-related features, fillers may, for example, be added as fine fractions; for example, fillers from the silicic acid, alumosilicate, aluminum oxide, titanium oxide, kaolin, montmorillonite, bentonite, zeolite, starch, wood dust or activated carbon group. These fillers may added to the acid and/or alkaline constituent in a crystalline or amorphous form or in a highly dispersed form, as described in German Patent Document DE 42 16 868. Fine fractions which change the catalytic features of the particles may also be used in a customary manner. Magnesium acetyl acetonate, zirconium, copper acetyl acetonate or titanium acetyl acetonate may be added as homogeneous constituents.

The mixing of the alkaline constituent with the acid constituent to form a gelable instable sol may also be carried out in a manner known per se in any suitable mixing device, for example, in a mixing nozzle. Subsequently, the thus obtained sol is pumped directly into a spraying device by means of which it can be sprayed from below according to the invention into the reactant gas.

In particular, the method according to the invention may also be used to produce spherical particles from aluminum oxide. For this purpose, metastable acid aluminum oxide hydrates sols can be used which are known per se and which optionally contain additional constituents which improve the application-related features. Corresponding to the state of the art, suitable aluminum oxide hydrate sols may be produced from aluminum oxides, for example, from aluminum hydrates, such as boehmite, pseudo-boehmite, hydrargillite or bayerite, by dispersing in an aqueous acid, such as nitric acid. It is also possible to use in the method according to the invention aluminum oxide hydrate sols or dispersions obtained in a known manner from aluminum hydroxide and aluminum halogenides, such as $AlBr_3$, $AlCl_3$, or metallic aluminum by means of the influence of a diluted acid, such as HCl. In this case, the gelling of the sol may be caused by different methods of operation which are known per se or may be promoted by these methods when self-gelling sols are used. Thus, the gel formation may be triggered and promoted chemically as well as physically, for example, by a pH-value change (in the direction of an acid or an alkaline value), by a change of temperature (heating or cooling) as well as, for example, by a photochemical initiation.

FIG. 1 schematically illustrates an example of the construction of an apparatus for implementing the method according to the invention. By means of a spraying system, the gelable sol is sprayed from below at an angle $\alpha<90°$, for example, an angle of from 40° to 89°, preferably 80° to 88°, into the reaction zone in such a manner that, after it leaves the spraying system, the sol will not be split up into sol droplets which are largely of an identical size until immediately before entering or when passing through the inlet opening into the reaction zone, in which case, at the moment of their formation, the sol droplets are virtually immediately subjected to the gelling effect of the reactant gas. In addition to depending on the angle, the disintegration of the sol into individual sol droplets also depends on the viscosity of the sol, on the respective used spraying device as well as on the pressure at which the sol leaves the spraying device. In order to adjust according to the invention the point at which the sol splits open into individual sol droplets, the distance d between the spraying device and the inlet opening into the reaction zone is varied at the start of the spraying operation by the person skilled in the art by an inspection in such manner—that is, the distance d is reduced or optionally increased—until the splitting point of the sol into individual sol droplets is situated directly in front of or in the inlet opening to the reaction zone.

After the entry into the reaction zone, the formed sol droplets fly along a trajectory path curved in the shape of a parabola through the reactant gas situated in the reaction zone, in which case they are fixed in their spherical shape; that is, they are presolidified. As the result of the fact that the sol droplets must pass along this parabola-shaped trajectory through the reactant gas, the reactant gas according to the method of the invention can contribute for a particularly long time to the presolidification of the sol droplets so that the danger of the deformation of the sol droplets during the impacting on the trap is already largely minimized. By means of the additional heating-up of the reaction zone, for example, by a heating to approximately 200° C., the presolidification of the particles may optionally be promoted further. In order to still further reduce the risk of a deformation, if desired, a trap whose height can be adjusted may be brought close to the reversal point of the parabola-shaped trajectory of the sol droplets at which the sol droplets have their lowest kinetic energy.

According to the method of the invention, a flat-stretched foil, such as a PVDF-foil or a PE- or PVC-foil, or a smooth collecting sheet or a collecting container filled with fluid may be used as the trap. When a smooth collecting sheet is used, it may be cooled as such or a sheet may be used which is uniformly coated with solid carbon dioxide. Particularly preferred embodiments of the method use a collecting container as a trap which is filled with a fluid, for example, with water or preferably with a reaction fluid. In this case, reaction fluids are all conventional acid or alkaline fluids as they are normally used for the aging of particles according to the sol/gel method. Conventional reaction fluids for this purpose are, for example, an aqueous ammonia solution, such as a 5 to 10% aqueous ammonia solution, or acid reaction fluids, such as hydrochloric acid, sulfuric acid or nitric acid in concentrations of from 1 to 5% in weight. When a reaction fluid is used, reactant gases which are correspondingly equivalent should expediently be used in the reaction zone. If an aqueous ammonia solution is present as a reaction fluid, ammonia gas or vapors of organic amines should be used as reactant gas. When acid reaction fluids, such as hydrochloric acid, sulfuric acid or nitric acid are used, the corresponding equivalent acid reactant gases should be used, thus hydrogen chloride, sulfur dioxide or nitric oxides.

The reactant gas used in the method according to the invention can be easily held in the reaction zone as a closed receptacle above the corresponding trap. In this case, as required, fresh reactant gas can be continuously refilled by means of a separate feeding of gas into the reaction zone. In addition to the above-mentioned alkaline and acid reactant gases, when self-gelling sols are used, inert gases, such as air or nitrogen, may also be used as reactant gases, in which case optionally the presolidification of the sol particles can be promoted by heating the reaction zone to temperatures of up to 1,000° C. or more, preferably 500° to 800° C. When a collecting sheet is used as a trap which is uniformly coated with solid carbon dioxide, the reaction zone may optionally be cooled to temperatures below the room temperature in order to, in this manner, promote the presodilification of the sol particles by lowering the viscosity.

From the trap, the presolidified sol particles may be fed to the processing which is normally carried out for particles produced according to the sol/gel method. This processing normally comprises the processing steps of washing, drying and optionally calcining. Thus the sol particles are normally dried at temperatures in the range of from 100° to 200° C. for a duration of from 1 to 24 hours. In a variant, when a flat-drawn foil or a smooth collecting sheet is used as a trap, the presolidified sol particles may also be transferred directly into a drying unit, for example, into a spraying dryer which is known per se.

For producing particularly small particles, in particular particles having a diameter in the range of from 0.001 mm to 0.3 mm, in a modification of the method according to the invention, an apparatus is expediently used which is schematically illustrated in FIG. 2. This apparatus differs from the apparatus shown in FIG. 1 in that very small sol droplets are sprayed as fog from below into the reaction zone. In this variant of the method, the small sol droplets are produced as fog by a nozzle, expediently by a spiral nozzle or preferably by an ultrasonic nozzle, which small sol droplets are then sprayed according to the invention from below, for example, by means of a vane-type ventilator known from ventilating systems, into the reaction zone containing the reactant gas. The further steps will then take place analogously to the process steps described above for the method of operation for larger particles illustrated in FIG. 1.

The spherical particles obtained according to the invention by means of the variants of the method described above, in a further embodiment of this method, may also be subjected to a treatment by means of a lower alkyl alcohol, i.e., a $C^1$- to $C_4$-alcohol, such as methanol, ethanol, propanol or isopropanol or to a treatment by means of acetone, before, after being collected in the trap, they are subjected to drying. Preferably, isopropanol is used for this treatment which should be as anhydrous as possible. As a result of the treatment by means of a low alkyl alcohol or acetone, on the one hand, advantageously a gluing-together of the obtained particles, particularly of particles of an average diameter of less then 1 mm, may be avoided during the drying and, on the other hand, as a result of this treatment, the pore volume of the obtained particles may be expanded. For this purpose, the particles are transferred from the trap into a receptacle and are coated several times with alcohol for a during of 1 minute to 24 hours, expediently for 2 to 3 hours. Thus, for example, by means of this treatment, the pore volume also of aluminum oxide particles can be changed in a targeted manner. Thus, after the treatment by means of a low alkyl alcohol, for example, the pore volume of aluminum oxide particles produced according to the method of the invention will be in the range of from 0.4 to 2.5 ml/g (determined after the drying).

By means of the method according to the invention, it is advantageously possible to obtain particles from inorganic oxides which have a very uniform spherical shape, a narrow distribution of pore diameters as well as a very narrow grain spectrum. In this case, the occurrence of larger amounts of undersized or oversized grain can be largely avoided. In this case, a narrow grain spectrum is a grain spectrum in the case of which 80% of the particles have a diameter within the range indicated in the following table about the respective median diameter (normal distribution).

| Median Diameter of Particles Range of [mm] | Grain Spectrum Which 80% of the Particles Have about the Respective Median Diameter [mm] |
| --- | --- |
| 1.0–5.0 | ± 1.0 |
| 0.1–1,0 | ± 0.1 |
| 0.01–0.1 | ± 0.02 |
| 0.001–0.01 | ± 0.004 |

In the method according to the invention, no forming oil has to be used so that the thus produced particles are free of other impurities or discolorations. Also, in the case of particles produced according to the method of the invention, the pore volume can advantageously be expanded by means of a treatment with acetone or a low alkyl alcohol before the drying. Furthermore, the spherical particles produced according to the method of the invention exhibit a surprisingly high resistance to wear.

In addition, the invention comprises spherical particles made from inorganic oxides, preferably from silicon dioxide, aluminum or alumosilicate which have a) a diameter in the range of from 0.01 to 5 mm, preferably 0.02 to 3.5 mm, b) a specific surface in the range of from 1 to 900 m²/g, preferably 100 to 800 m², c) a bulk weight in the range of from 0.1 to 1.0 g/ml, d) a pore volume in the range of from 0.25 to 2.5 ml/g, e) a distribution of the pore diameters with a maximum (monomodal pore distribution) in the range of from 15 to 2,000 Å, preferably 15 to 400 Å.

The specific surface, the pore volume and the pore distribution of the particles according to the invention may be determined in a manner known per se by mercury porosimetry or the sensing and analysis of nitrogen sorption curves. These will then permit the determination of the maximum of the pore diameters and of the median pore diameters.

Preferably, the particles according to the invention exhibit a monomodal pore distribution at which 80%, preferably 95%, of the pore diameters correspond to the formula $0.8\ R \leq R \leq 1.2\ R$, R corresponding to the median pore diameter in the range of from 15 to 400 Å.

Particularly preferred in this case are particles made from aluminum oxide which have a pore volume in the range of from 0.5 to 2.5 ml/g, preferably 0.7 to 2.5 ml/g, and a median pore diameter R in the range of from 60 to 380 Å.

The particles according to the invention may preferably be produced by means of the above-indicated method of the invention. In addition to having a particularly uniform spherical shape and a narrow grain spectrum, the particles according to the invention are also characterized by a high pore volume while the distribution of the pore diameters is unusually narrow. In this case, it is particularly advantageous that at least 80%, preferably 95%, of the particles have a pore diameter which is in the above-indicated tolerance range of $0.8\ R \leq R \leq 1.2\ R$. In this case, the fraction of macropores, that is, of pores of a diameter of more than 200 Å, is below 5%. The particles according to the invention therefore have a particularly homogeneous surface which is very advantageous particularly when they are used as catalyst supports. FIGS. 3A and 3B are electron-microscopic images of the surfaces which are examples of the surfaces of particles produced according to the invention and which show their homogeneous uniform surface structure. Another special feature of the particles according to the invention is the fact that, with their high pore volume, they have a surprisingly high resistance to wear which, in conjunction with the high bulk density, makes them particularly suitable for a use as catalysts or catalyst supports in fluidized bed reactors.

Furthermore, the invention comprises the use of the spherical particles produced according to the method of the invention as catalysts, catalyst supports, ion exchangers, adsorption and drying agents.

Thus, catalysts may be produced, which are doped, for example, with precious metals or transition metals and which contain the particles produced according to the method of the invention in the form of catalyst supports. They may, for example, contain precious metals, such as gold, silver, platinum, rhodium or palladium or transition metals, such as copper. The content of such metals is normally in the range of from 0.1 to 5% in weight, relative to the finished catalyst support. Furthermore, metal compounds, for example, oxides of metals, particularly oxides of transition metals, may be used, such as oxides of manganese, iron, nickel or cobalt. Naturally mixtures of metals, mixtures of metal compounds or mixtures of one or several metals and one or several metal compounds may also be applied to the carrier. For example, the metal compound of a catalyst according to the invention may consist of palladium and/or rhodium or of palladium and copper. Such a catalysts on the basis of the particles according to the invention may be used, for example, in petrochemical or organic-chemical synthesis process, for example, in oxidation, hydration, oxychlorination or polymerization processes, or in catalyst processes for purifying waste water and exhaust gas. The production of the catalysts according to the invention may take place in a manner known per se. For example, metal salts or complex metal compounds may be applied to the particles by impregnating processes, spraying processes or precipitation processes and, after the drying and calcining, may optionally be reduced. Preferably, the metals are applied to the particles by means of an impregnating process, for example, by means of a solution or suspension of metal salts or complex metal compounds in water or an organic solvent. One advantage of the catalysts obtained on the basis of the particles produced according to the invention is their high resistance to wear.

The following examples have the purpose of explaining the invention without limiting it.

BRIEF DESCRIPTION OF THE DRAWINGS

FIG. 1:

Schematic Construction of a Device for implementing the Method according to the Invention:

(1): sol, (2): pump, (3): spraying device, (40:sol spray, (5): sol droplets, (6): reaction zone with reactant gas, (7): reactant gas supply, (8): trap, (9) sieve (facultative), (10): collecting container for the particles, (11): pump (facultative), (12): return flow of the reaction fluid into the collecting receptacle (facultative), α: angle α; d: variable distance between spraying device and inlet opening into the reaction zone.

FIG. 2:

Schematic Construction of Another Apparatus for implementing the Method according to the Invention for Small Particles (0.001 to 0.3 mm):

(1) sol, (2): spraying device with atomizer nozzle, (3): fog consisting of small sol droplets, (4): reaction zone with reactant gas, (5): trap, (6): reactant gas supply, (7): sieve (facultative), (8): collecting container, (9): pump (facultative), (10): return flow of the reaction fluid into the collecting receptacle.(facultative)

FIG. 3:

Electron-Microscopic Images Concerning the Surface Condition of Particles Produced according to the invention

FIG. 3A:

Particles Made from Aluminosilicates of a Diameter of 2.5–3.5 mm

FIG. 3B:

Particles Made from Silicon Dioxide of a Diameter of 0.4 to 0.6 mm

FIGS. 4A, 4B, 5A, 5B, 6A, 6B, 7A, 7B, 8A, 8B:

Diagrams of the Distribution of Pore Radii of Particles Produced according to the Invention by Means of Mercury Porosimetry:

The following is in each case entered on the axes:
x-axis: pore radius [Å]
y-axis: cumulated pore volume [mm$^3$/g]

EXAMPLES

Figure 1:
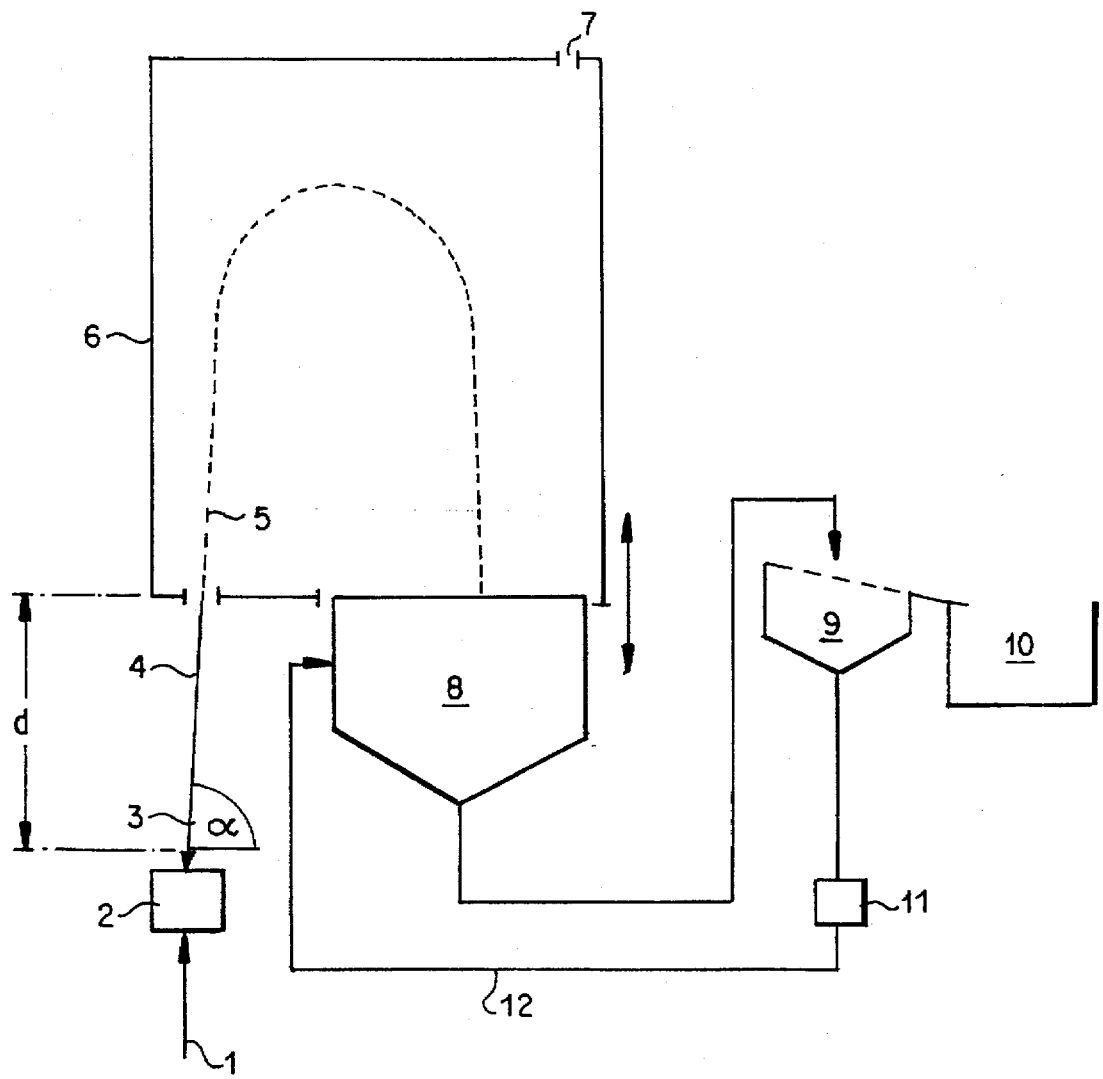
FIGS. 1 to 8.
Figure 2:
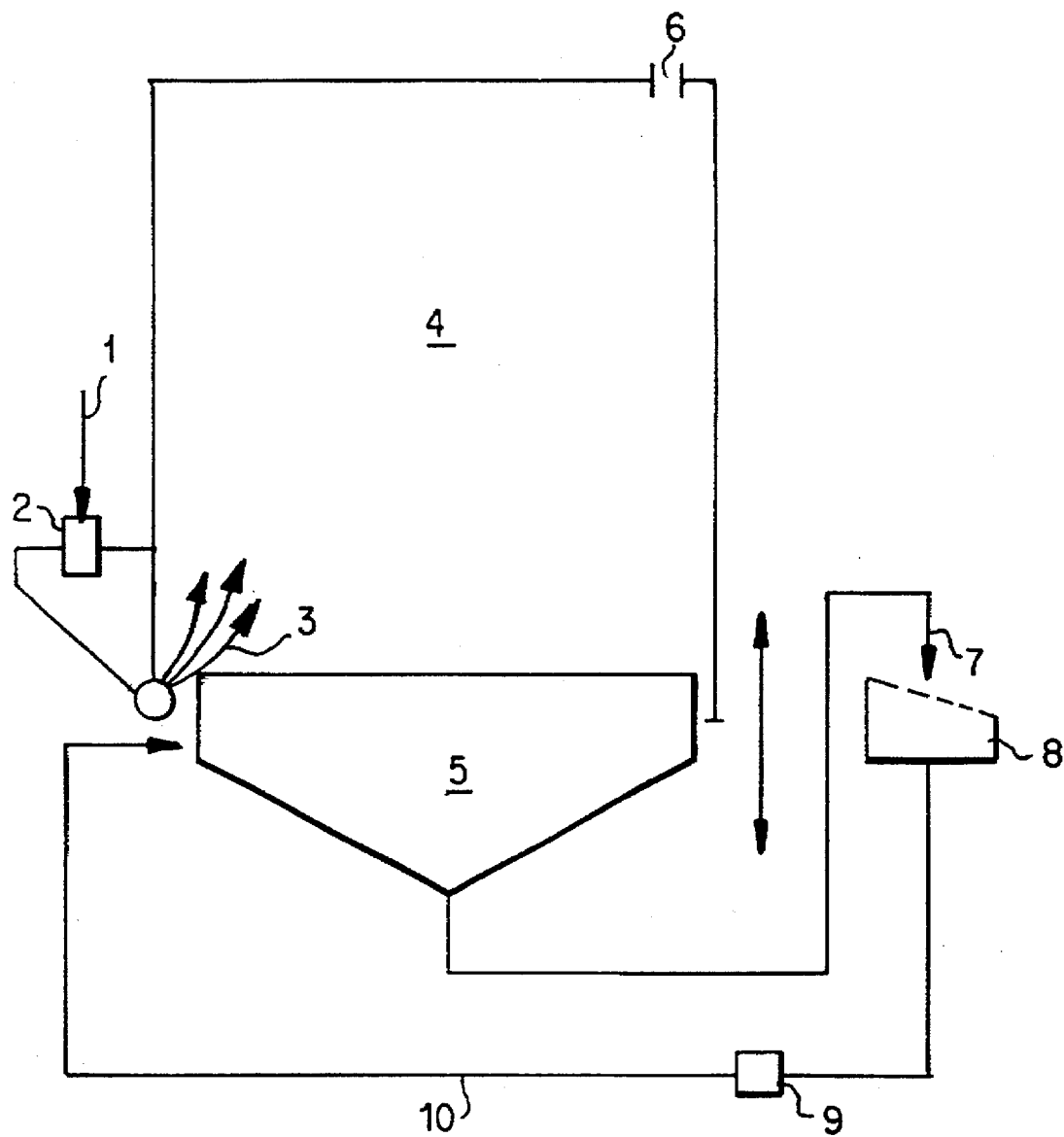

The following Examples 1 to 8 were carried out in an apparatus according to FIG. 1:

Example 1

According to the method of the invention, spherical particles were produced from silicon dioxide. For this purpose, an acid solution and an alkaline solution of the concentrations indicated in Table 1 were produced separately. As fillers, the mashes also indicated in Table 1 were added to the solutions. The acid or alkaline solution was combined together with the corresponding aerosil or $SiO_2$ mash in the volume ratio indicated in Table 1 to form the respective acid or alkaline constituent.

The acid component SK and the alkaline component AK were mixed with one another in a mixing nozzle known per se at a temperature of approximately 10° C. and were immediately and continuously processed in an apparatus according to FIG. 1. For this purpose, the sol obtained from the mixing of the two conconstituents at a pressure difference of at least 2 bar at pH 6.4 was sprayed by way of the pump 2 and the hollow needle 3 (diameter 3.7 mm, length 10 cm) with a flow rate of 4 l/min in a sol spray 4 into the reaction zone 6 in such a manner that, when entering the reaction zone 6, the sol spray split open into sol droplets 5. After flying on a curved trajectory through the reaction zone 6 containing the reactant gas, the sol droplets 5 were collected in the collecting container filled with the reaction fluid which acts as a trap 8. Ammonia gas was used as the reactant gas which was continuously refilled into the reaction zone 6 by way of the reactant gas supply 7. An aqueous 5% ammonia solution was used as the reaction fluid.

The particles were aged for approximately 30 minutes in the aqueous ammonia solution and where then separated by way of the sieve 9 from the reaction fluid and were transferred to the collecting container 10. By way of the pump 11, the reaction fluid was pumped through the return flow 12 back into the trap 8.

Then the obtained particles were subjected in a manner known per se to a cation exchange with a 0.5% ammonium sulfate solution, were washed until they were free of sulfates, were dried for 18 hours at 180° C. and were tempered for 4 hours at 600° C. Spherical particles were obtained which had diameters in the range of from 2.5 to 3.5 mm, whose bulk density, specific surface and pore volume are indicated in Table 2.

TABLE 1

| Composition of Used Solutions and Used Constituents | | |
|---|---|---|
| Acid Solution A: | H$_2$/SO$_4$ | 15,20% in weight |
|  | H$_2$O | 84.80% in weight |
|  | d$_{20}$ | 1,106 g/ml |
| Aerosil Mash AM: | Aerosil$^R$200: | 10.00% in weight |
|  | H$_2$O: | 90.00% in weight |
|  | d$_{20}$ | 1,055 g/ml |
| (insert manually) = V$_{AM}$:V$_A$ = 1.78 | | |
| Acid Constituents SK | H$_2$SO$_4$: | 5.60% in weight |
|  | Aerosil$^R$200: | 6.30% in weight |
|  | H$_2$O: | 88.07% in weight |
|  | d$_{20}$: | 1.235 g/ml |
| Alkaline Solution B: | Na$_2$O: | 5.88% in weight |
|  | SiO$_2$: | 19.11% in weight |
|  | H$_2$O: | 75.01% in weight |
|  | d$_{20}$: | 1.235 g/ml |
| SiO$_2$-Mash AL | SiO$_2$: | 21.40% in weight |
|  | H$_2$O: | 78.60% in weight |
|  | d$_{20}$: | 1.138 g/ml |
| (insert manually) = V$_{AL}$:V$_B$ = 0.395 | | |
| Alkaline Constituent AK: | Na$_2$O: | 4.31% in weight |
|  | SiO$_2$: | 19.72% in weight |
|  | H$_2$O: | 75.97% in weight |
|  | d$_{20}$: | 1.209 g/ml |

V: Volume; d$_{20}$: density at 20° C.

Figure 4A:
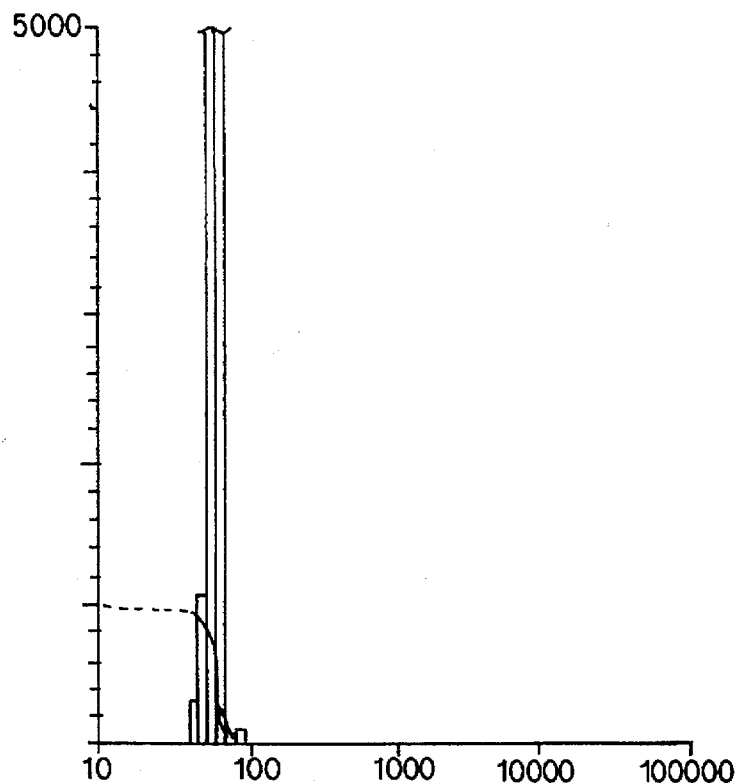

TABLE 2:

| Features of Process Products Obtained according to Example 1 | |
|---|---|
| Diameter: | 2.5–3.5 mm |
| Bulk Weight: | 0.9 g/ml |
| Specific Surface: | 334 m$^2$/g |
| Pore Volume: | 1.01 ml/g |
| Distribution of Pore Radii: | Shown in FIG. 4 A) |

Example 2

According to the method of the invention, spherical particles were produced from alumosilicate.

For this purpose, an acid solution A and an alkaline solution B were produced separately:

| Solution A | H$_2$SO$_4$ | 9.05% in weight |
|---|---|---|
|  | Al$_2$(SO$_4$)$_3$ | 0.89% in weight |
|  | H$_2$O | 90.06% in weight |
|  | d$_{20°}$ | 1.065 g/ml |
| Solution B | Na$_2$O | 5.49% in weight |
|  | SiO$_2$ | 18.53% in weight |
|  | H$_2$O | 75.98% in weight |
|  | d20° | 1.226 g/ml |

The acid solution A and the alkaline solution B were mixed with one another at a temperature of approximately 7° C. in a mixing nozzle known per se and were immediately and continuously processed in an apparatus according to FIG. 1.

For this purpose, the sol obtained from mixing the two constituents at a pressure difference of at least 2 bar at pH 8.3 was sprayed by way of a hollow needle of a diameter of 3.7 mm and a length of 10cm at a rate of 3.9 l/minute in a sol spray 4 into the reaction zone in such a manner that the sol spray split open into sol droplets 6 when entering the reaction zone 6.

After flying along a curved trajectory through the reactant gas, the sol droplets 5 were collected in the collecting container 8 filled with reaction fluid. HCl-gas was used as the reactant gas and was continuously refilled into the reaction zone 6 by way of the reactant gas supply 7. An aqueous 2.5% HCl-solution was used as the reaction fluid.

The particles were aged for approximately 30 minutes in the aqueous hydrogen chloride solution and then separated from the reaction fluid by way of the sieve 9 and transferred to the collecting container 10. The reaction fluid was pumped by way of the pump 11 through the return flow 12 back into the trap 8.

In a manner known per se, the obtained particles were then subjected to a cation exchange with a 0.5% sulfuric acid solution, were washed until they were free of sulfates, were dried for 18 hours at 180° C. and were tempered four 4 hours at 200° C.

Spherical alumosilicate particles were obtained which had diameters in the range of from 2.5 to 3.5 mm and whose bulk density, specific surface and pore volume are indicated in the following table.

TABLE 3

Features of Process Products Obtained according to Example 2

Figure 3A:
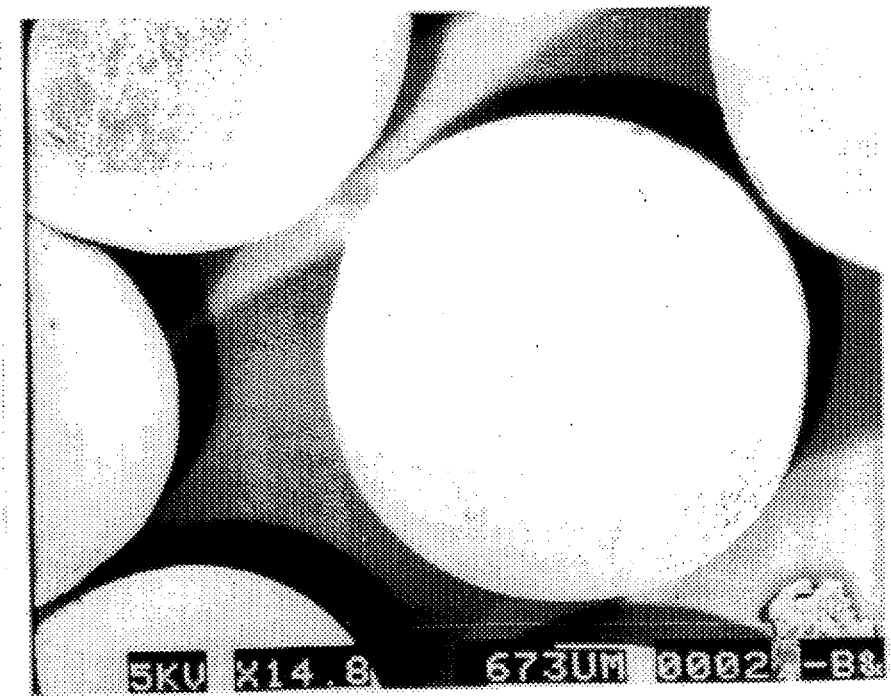

| Diameter | 2.5–3.5 mm |
|---|---|
| Bulk Density | 0.77 g/ml |
| Surface | 741 m²/g |
| Pore Volume | 0.35 ml/g |
| Surface Condition: | Illustrated in FIG. 3A) |

Example 3

Spherical particles made from aluminum oxide were produced as follows:

A metastable acid aluminum oxide hydrate sol (Condea Disperal® 30/2) with a composition of 14.19% in weight $Al_2O_3$ and 85.81% in weight of water was sprayed upwards in an apparatus according to FIG. 1 by means of the pump 2 at a pressure of 6 bar by way of 10 hollow needles (diameter: 0.70 mm; length: 3.2 cm) with a flow rate of 0.75 l/minutes, in which case, when entering the reaction zone filled with ammonia gas, the sol sprays are split open into a succession of individual sol droplets of the same size.

In the following, the other reaction conditions are indicated:

Receiver: 5% ammonia solution

Aging: 1 hour

Drying: 8 hours 120°

Tempering: 4 hours 600°

The obtained particles exhibited the following characteristics:

Example 3a

Diameter: 0.4–0.6 mm

Bulk Density: 0.71 g/ml

Specific Surface: 287 m²/g

Pore Volume: 0.44 ml/g

Examples 3b to 3d

Some of the particles obtained according to Example 3 were subjected to an additional tempering. Their characteristics are indicated in the following Table 4.

TABLE 4

Figure 4B:
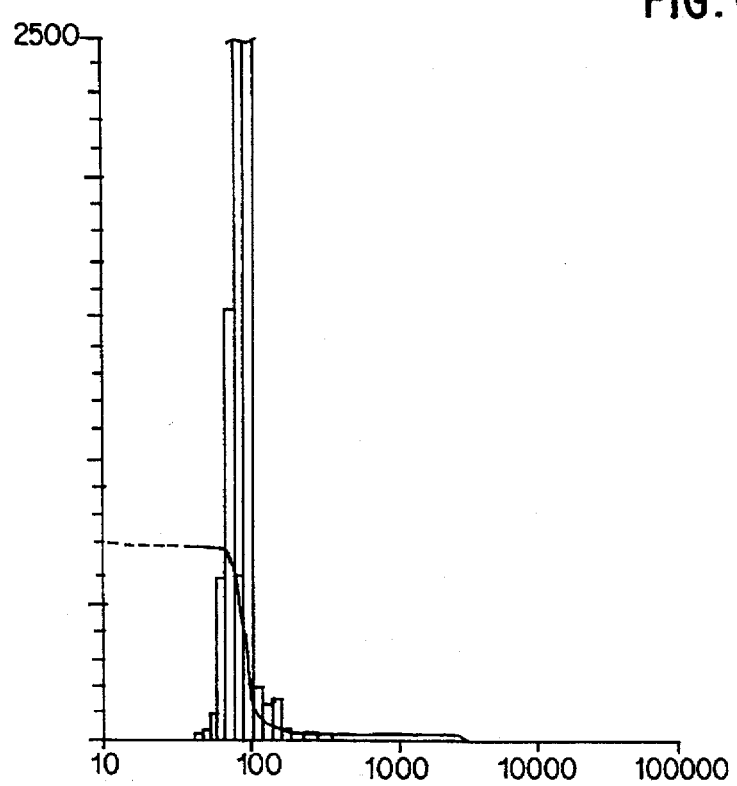
Figure 5A:
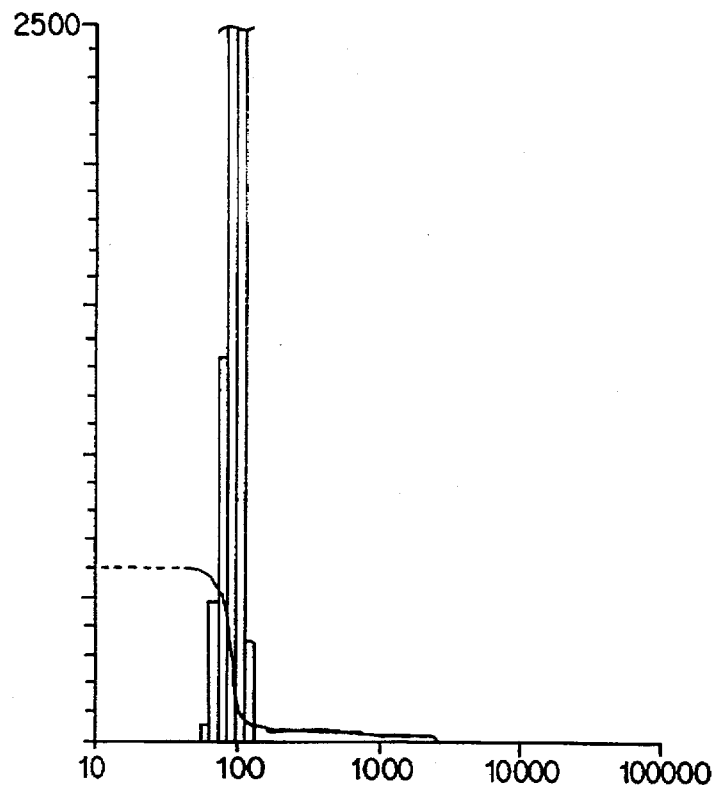
Figure 5B:
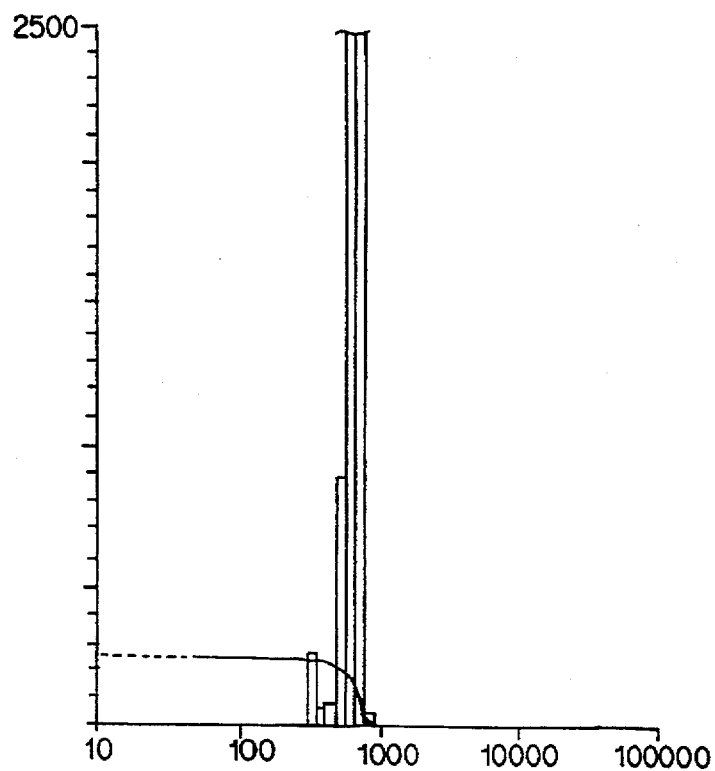

| Example | Additional Tempering | Specific Surface [m²g] | Pore Volume [ml/g] | Distribution of Pore Radii see in: |
|---|---|---|---|---|
| 3b | 2 h 700° C. | 212 | 0.73 | |
| 3c | 2 h 900° C. | 163 | 0.72 | FIG. 4B |
| 3d | 2 h 1,000° C. | 125 | 0.61 | FIG. 5A |
| 3e | 2 h 1,200° C. | 8 | 0.25 | FIG. 5B |

Example 4

Spherical particles on the basis of aluminum oxide were produced as indicated in Example 3. In addition, these particles were subjected to a treatment with anhydrous isopropanol (density: 0.785 g/ml). For a duration of 2 hours, before the drying, the obtained particles were coated for this purpose with 1 liter isopropanol per 1 liter particles respectively. In the case of some of the particles, the isopropanol treatment was carried out several times in that the particles were decanted from the isopropanol solution and were then coated again for the same time period in an identical manner with isopropanol. In the case of some particles, this isopropanol treatment was carried out up to eight times successively. As described in Example 3, after the drying and calcining, particles were received which had the characteristics indicated in the following table.

Table 5 shows that the pore volume, the bulk density as well as the median pore diameter of aluminum oxide particles produced according to the method of the invention can be varied in wide ranges by means of the additional alcohol treatment.

TABLE 5

Characteristics of the Process Products Obtained according to Example 4
$Al_2O_3$, Diameter of Particles: 0.4–0.6 mm

| Example | Alcohol Treatm. | Bulk Density [g/ml] | Pore Vol. [ml/g] | Specif. Surface [m²/g] | Median Pore Diameter [Å] | Drying [h/°C.] | Calcination [h/°C.] |
|---|---|---|---|---|---|---|---|
| 4a | 1 | 0.53 | 0.75 | 272 | 110 | 8/120 | 4/600 |
| 4b | 2 | 0.47 | 0.91 | 282 | 129 | 8/120 | 4/600 |
| 4c | 3 | 0.41 | 1.15 | 292 | 156 | 8/120 | 4/600 |
| 4d | 4 | 0.35 | 1.35 | 298 | 181 | 8/120 | 4/600 |
| 4e | 5 | 0.30 | 1.61 | 296 | 218 | 8/120 | 4/600 |
| 4f | 8 | 0.14 | 2.48 | 284 | 349 | 8/120 | 4/600 |

(Density of isopropanol before treatment of particles: d = 0.785 g/ml)

Figure 6A:
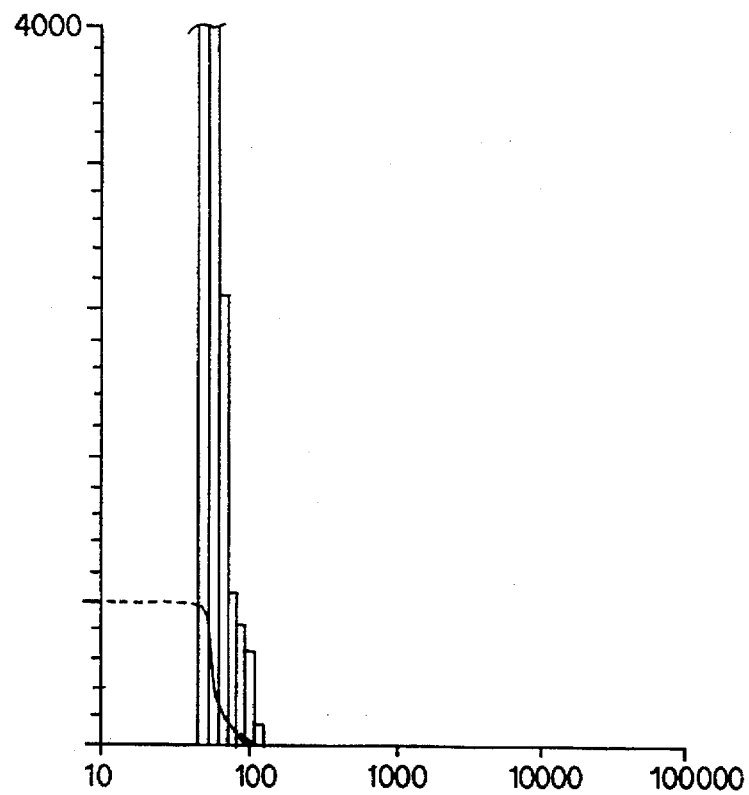
Figure 6B:
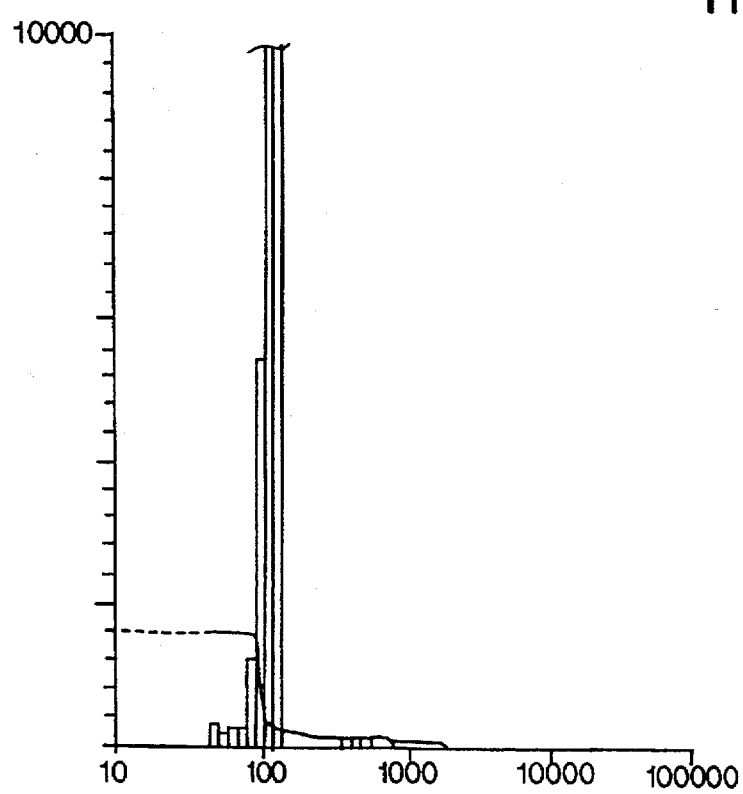

The distribution of pore radii of the particles according to Example 4a) is indicated in FIG. 6A); that according to Example 4e is indicated in FIG. 6B).

Example 5

Spherical particles made from aluminum oxide were produced as follows:

A metastable acid aluminum oxide hydrate sol (Condea Disperal® 30/1) with a composition of 18.00% in weight $Al_2O_3$ and 82.00% in weight of water was sprayed upwards in a apparatus according to FIG. 1 by means of an electrically driven spray gun (Bullcraft N, 80 W) at a flow rate of 0.060 l/minute, into the reaction zone filled with ammonia gas.

Figure 7A:
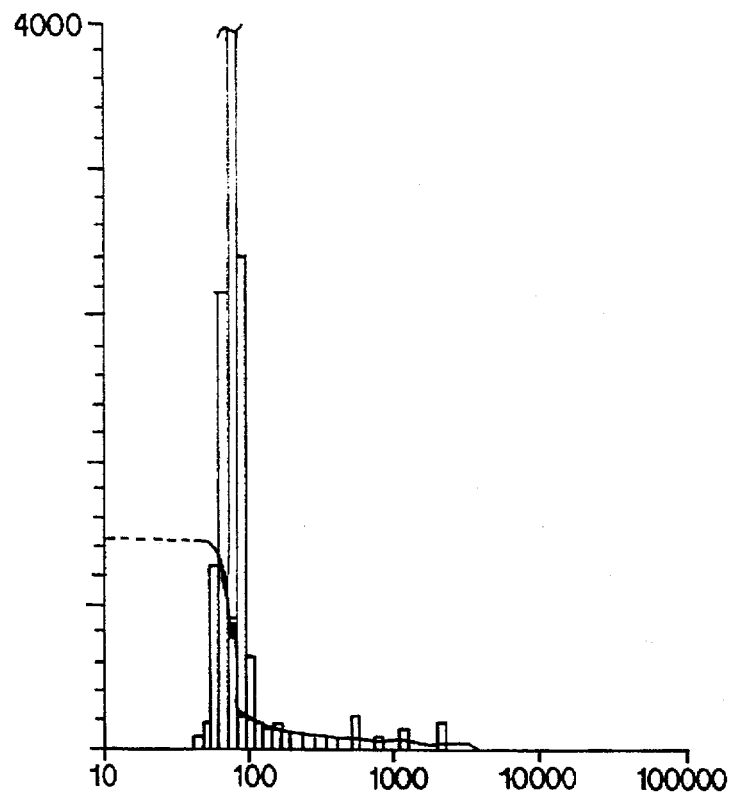

In the following, the other reaction conditions as well as the characteristics of the obtained particles will be indicated:

Receiver: 5% ammonia solution
Aging: 0.5 h
Alcohol Treatment: twice 2 h, isopropanol
Drying: 8 hours 120°
Tempering: 4 hours 600°
Diameter: 0.02–0.05 mm
Bulk Weight: 0.43 g/ml
Specific Surface: 291 m$^2$/g
Pore Volume: 1.19 ml/g
Distribution of Pore Radii: Illustrated in FIG. 7A).

Example 6

Spherical particles made from aluminum oxide were produced as follows:

A metastable acid aluminum oxide hydrate sol (Versal® 900) with a composition of 15.35% in weight $Al_2O_3$, 0.38% in weight $HNO_3$, and 84.27% in weight of water was sprayed upwards in an apparatus according to FIG. 1 by means of the pump 2 at a pressure of 6 bar by way of 10 hollow needles (diameter: 0.70 mm; length: 3.2 cm) as described in Example 3, at a flow rate of 0.75 l/minute.

Figure 7B:
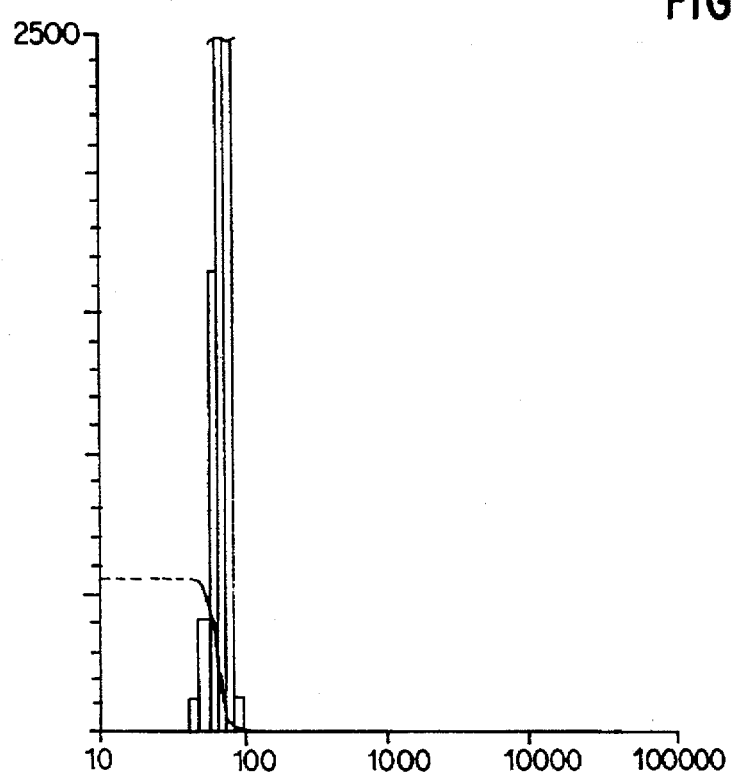

In the following, the other reaction conditions are indicated:
Receiver: 5% ammonia solution
Aging: 1 hour
Drying: 10 hours 180° C.
Tempering: 6 hours 600°
Diameter: 0.4–0.6 mm
Bulk Weight: 0.66 g/ml
Specific Surface: 190 m$^2$/g
Pore Volume: 0.58 ml/g
Distribution of Pore Radii: Illustrated in FIG. 7B).

Example 7

Spherical particles made from silicon dioxide were produced as follows:

A metastable siliceous sol (Bayer 200 S, 30% $SiO_2$), acidified with nitric acid to pH4, was sprayed upwards in an apparatus according to FIG. 1 by means of the pump 2 at a pressure of 6.5 bar by way of 10 hollow needles (diameter: 0.70 mm; length 3.20 cm) at a flow rate of 0.73 l/minute, in which case, when entering the reaction zone filled with ammonia gas, the sol sprays were split open into a succession of individual sol droplets of the same size.

Figure 3B:
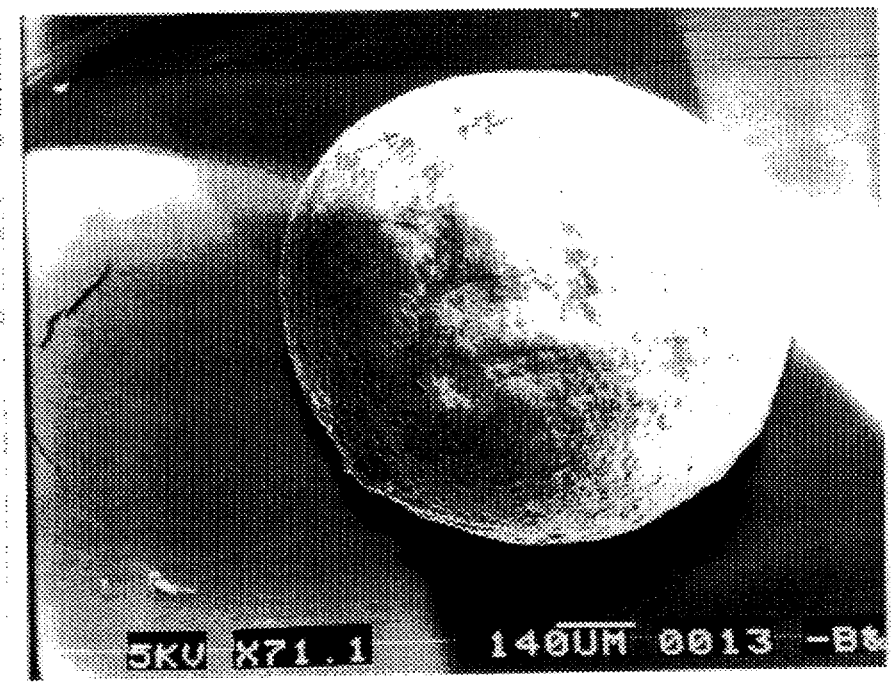
Figure 8A:
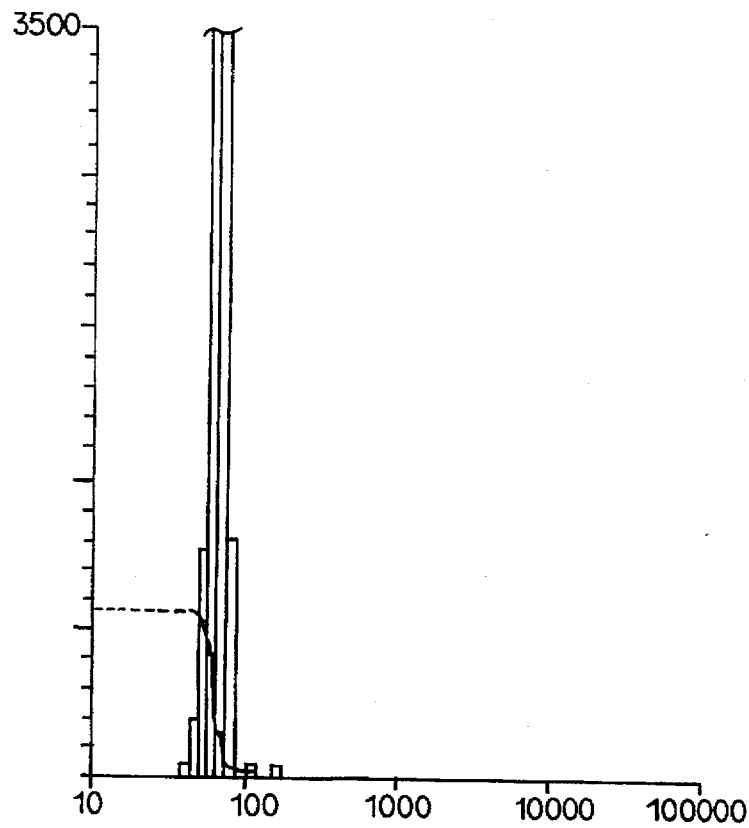

In the following, the other reaction conditions as well as the characteristics of the obtained particles are indicated:
Receiver: 5% ammonia solution
Aging: 0.5 h
Alcohol Treatment: twice 2 h, isopropanol
Drying: 8 h 120°
Tempering: 4 hours 200°
Diameter: 0.4–0.6 mm
Bulk Weight: 0.49 g/ml
Specific Surface: 297 m$^2$/g
Pore Volume: 0.80 ml/g
Distribution of Pore Radii: Illustrated in FIG. 8A)
Surface Condition: Illustrated in FIG. 3B).

Example 8

According to the method of the invention, spherical particles were produced from silicon dioxide.

For this purpose, an acid solution A and an alkaline silicate solution B were produced separately:

| Solution A | $H_2SO_4$ | 9.49% in weight |
|---|---|---|
| | $H_2O$ | 90.51% in weight |
| | $\alpha_{20}$· (d?) | 1.065 g/ml |
| Solution B | $Na_2O$ | 5.49% in weight |
| | $SiO_2$ | 18.53% in weight |
| | $H_2O$ | 75.98% in weight |
| | $\alpha_{20}$· (d?) | 1.226 g/ml |

The acid solution A and the alkaline solution B were mixed with one another in a mixing nozzle known per se at a temperature of approximately 25° C. and were processed immediately and continuously in an apparatus according to FIG. 1.

For this purpose, the sol obtained by the mixing of the two constituents at a pressure difference of at least 2 bar at pH 8.3 was sprayed by way of a conventional commercially available spiral nozzle (Firm Spraybest, Greenfield, U.S.A.) at a rate of 1.2 l/minute in a sol spray 4 into the precipitation tower 6 in such a manner that, when entering the precipitation tower 6, the sol spray split open into sol droplets 5.

After flying along a curved trajectory through the reactant gas in the precipitation tower 6, the sol droplets 5 were collected in the collecting container 8 filled with reaction fluid. An HCl-gas was used as a reactant gas and was constantly refilled into the precipitation tower 6 by way of the reactant gas supply 7. An aqueous 2.5% HCl-solution was used as the reaction liquid.

The particles were aged for approximately 30 minutes in the aqueous hydrogen chloride solution and were then separated from the reaction fluid by way of the sieve 9 and transferred into the collecting container 10. The reaction fluid was pumped by way of the pump 11 through the return flow 12 back into the collecting container 8.

Then, in a manner known per se, the obtained particles were subjected to a cation exchange with 0.5% sulfuric acid solution, were washed until they were free of sulfate, were dried for 18 hours at 180° C., and were then processed in different manners as indicated in the following Table 6. Spherical alumosilicate particles were obtained which had diameters in the range of 0.9 to 1.5 mm, whose characteristics are also listed in the Table 6.

TABLE 6

Different Processing Steps and Characteristics of the Process Products Obtained according to Example 8.

| Example Further Treatment after Drying | 8a | 8b 4 h 550° Hydrothermal Aging 2 h 180° C. 1 n $NH_4OH$ | 8c Expanding of the Pore Volume by Isopropanol Treatment, 5× |
|---|---|---|---|
| Tempering | 4 h 550° C. | 4 h 600° C. | 4 h 180° C. |
| Diameter | 0.9–1.5 mm | 0.9–1.5 mm | 0.9–1.5 mm |
| Bulk Weight | 0.61 g/ml | 0.48 g/ml | 0.28 g/ml |
| Surface | 722 m$^2$/g | 27 m$^2$/g | 650 m$^2$/g |
| Pore Volume | 0.49 ml/g | 0.50 ml/g | 1.90 ml/g |

Figure 8B:
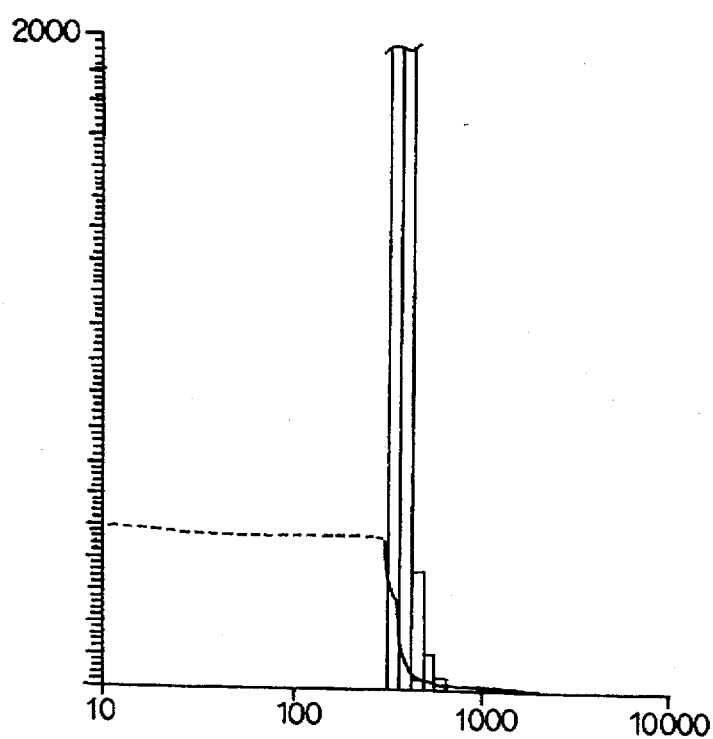

The distribution of bore radii of the particles obtained according to Example 8b is illustrated in FIG. 8B).

Example 9
Determination of Resistance to Wear

The resistance to wear of the particles produced according to Example 1 to 8 was examined according to the following method for determining the relative resistance to wear: 1.0 g respectively of the particles to be examined were weighed into a 10 ml snap cover glass (45×22 mm) and rinsed twice with 5 ml deionized water (VE-water) in order to remove possibly adhering dust. In this case, the water adhering to the surface was suctioned off by means of a capillary tube so that only the water situated in the pores remained on the particles. Then 5 ml VE-water were added again and the closed glass was shaken for 1 minute on a test glass shaker (Firm Heidolf, Reax 1R) at 2.400 r.p.m. 2 ml of the supernatant solution were then immediately transferred into a 10 mm vessel and the extinction value E was measured several times after a repeated shaking-up at a wavelength of 500 μm (CADAS 100 Spectrophotometer, Firm Dr. Lange). In the case of E-values which were larger than 1, the sample was correspondingly diluted, while there was linearity of the measured values.

Under these testing conditions, particles, which are mechanically stable and therefore resistant to abrasion, have E-values in the range of from 0.1 to 0.7.

The following Table 7 shows the values obtained in this test for the relative resistance to abrasion of the particles produced according to Example 1 to 8. Table 7 also contains comparative values for the resistance to abrasion of aluminum oxide particles produced according to prior art.

TABLE 7

Resistance to Wear

| Particle Produced according to the Invention in Example | Material | Diameter mm | Pore Vol. ml/g | Extinction E |
|---|---|---|---|---|
| 1 | SiO$_2$ | 2.5–3.5 | 1.01 | 0.60 |
| 3a | Al$_2$O$_3$ | 0.4–0.6 | 0.73 | 0.26 |
| 3b | Al$_2$O$_3$ | 0.4–0.6 | 0.72 | 0.25 |
| 3c | Al$_2$O$_3$ | 0.4–0.6 | 0.61 | 0.18 |
| 3d | Al$_2$O$_3$ | 0.4–0.6 | 0.25 | 0.15 |
| 4a | Al$_2$O$_3$ | 0.4–0.6 | 0.75 | 0.22 |
| 4b | Al$_2$O$_3$ | 0.4–0.6 | 1.61 | 0.57 |
| 5 | Al$_2$O$_3$ | 0.02–0.05 | 1.19 | 0.29 |
| 6 | Al$_2$O$_3$ | 0.4–0.6 | 0.58 | 0.18 |
| 7 | SiO$_2$ | 0.4–0.6 | 0.80 | 0.71 |
| 8b | SiO$_2$ | 0.9–1.5 | 0.50 | 0.37 |
| *Granulate | Al$_2$O$_3$ | 0.3–0.6 | 0.35 | 0.70 |
| *Granulate | Al$_2$O$_3$ | 0.3–0.6 | 0.70 | 10.10 |

*Comparative examples of granulates made of a comparable quality of oxide of aluminum

We claim:

1. A method of producing spherical particles made from inorganic oxides by sol/gel conversion, said method comprising the steps of:

spraying an inorganic oxide sol upwardly at an angle of 80° to 88° from horizontal into a reaction zone containing a reactant gas which reacts with the sol to form a gel, said spraying being effected in such a manner that the sol does not split up into individual sol droplets until immediately before or as it enters the reaction zone, and the resulting sol droplets fly through the reaction zone on a curved trajectory during which they are gelled, and catching presolidified droplets in a trap.

2. A method according to claim 1, wherein said inorganic oxide sol is a sol based on at least one oxide selected from the group consisting of magnesium oxide, aluminum oxide, silicon dioxide, aluminosilicate, zinc oxide, titanium dioxide, chromium oxide, copper oxide, manganese oxide, cerium oxide, tin oxide, iron oxide, nickel oxide, lead oxide, molybdenum oxide, vanadium oxide, thorium oxide, zirconium oxide and hafnium oxide.

3. A method according to claim 2, wherein said inorganic oxide sol is a sol based on at least one oxide selected from the group consisting of aluminum oxide, silicon dioxide and aluminosilicate.

4. A method according to claim 1, further comprising drying trapped gelled droplets to obtain particles having an average diameter in the range from 0.001 mm to 5 mm.

5. A method according to claim 1, wherein said trap is a smooth collecting plate.

6. A method according to claim 5, wherein said trap is a foil.

7. A method according to claim 5, wherein said collecting plate is cooled.

8. A method according to claim 5, wherein said trap is a collecting container filled with a fluid.

9. A method according to claim 8, wherein said fluid is a reaction solution.

10. A method according to claim 9, wherein the reactant gas is ammonia and said reaction solution is an aqueous ammonia solution.

11. A process according to claim 9, wherein the reactant solution is selected from the group consisting of aqueous hydrochloric acid, aqueous sulphuric acid, or aqueous nitric acid.

12. A process according to claim 8, wherein the fluid is a reactant gas selected from the group consisting of NH$_3$, HCl, SO$_2$ and NO.

13. A method according to claim 1, wherein the sol further comprises at least one filler selected from the group consisting of silicic acid, aluminosilicate, aluminum oxide, titanium oxide, kaolin, montmorillonite, bentonite, zeolite, starch, wood dust and activated carbon.

14. A method according to claim 1, further comprising treating trapped presolidified sol droplets with a C$_1$–C$_4$ alcohol or acetone, and then drying the trapped droplets to obtain particles.

* * * * *